Oct. 10, 1933.  M. P. CHAPLIN  1,929,944
MOLDED PULP ARTICLE
Filed Aug. 19, 1930   2 Sheets-Sheet 1

INVENTOR
Merle P. Chaplin
BY
*Ellis Spear Jr.*
ATTORNEY.

Oct. 10, 1933.                M. P. CHAPLIN                1,929,944
                            MOLDED PULP ARTICLE
                           Filed Aug. 19, 1930          2 Sheets-Sheet 2

INVENTOR.
Merle P. Chaplin.
BY Ellis Spackh
ATTORNEY.

Patented Oct. 10, 1933

1,929,944

UNITED STATES PATENT OFFICE 1,929,944

MOLDED PULP ARTICLE

Merle P. Chaplin, Waterville, Maine, assignor, by mesne assignments, to Fidelity Trust Company, trustee, Portland, Maine, a corporation of Maine Application August 19, 1930. Serial No. 476,207

14 Claims. (Cl. 217—26.5)

This invention relates to the packing of fragile articles of variable size and of generally ovate shape.

For purposes of illustration eggs may be taken as a characteristic example, but it will be understood that such treatment is in no way limiting since the principles of my invention apply to the packaging of a wide variety of articles such as incandescent bulbs, radio tubes, and the like.

Eggs are usually shipped and stored in cases or crates each containing thirty dozen eggs. These cases are divided vertically into two sections and each section accommodates five layers or tiers of eggs with three dozen eggs in each layer.

In the shipment and handling of eggs it is very necessary that the eggs be firmly retained against vibration or looseness in the carrier in which they are packed. This not only serves to better preserve the eggs in shipment or storage but also greatly reduces the breakage of eggs while handling case or crate in which they are packed.

Eggs vary both in diameter and in length. In order to hold the smaller diameter eggs against motion it is necessary that the recesses in which these eggs be lodged be small enough to accomplish this result. When eggs of larger diameter are packed it is desirable that such recesses expand or be resilient to accommodate the larger size of eggs. Moreover, when packing extra long eggs it is important that the carrier containing these accommodate itself to any reasonable length of egg which may be packed.

It has heretofore been necessary in the packing of eggs in cases where several tiers are superimposed one on the other to provide an egg pocket cavity large enough for the largest egg to be packed. Each individual cavity has heretofore been made either of a tapering or semispherical member in which the egg was placed or else the egg cavity has been defined by a sheet of flat material, or of flat material in which shallow cups are formed and on which is placed board divisions sufficiently far apart to accommodate the largest diameter of the egg and of sufficient height to accommodate the longest length of egg. This defines rectangular chambers in which the egg is loosely retained. On top of these board divisions is placed a second flat or cup member for a second tier or layer of eggs.

Another method sometimes employed is to have a flat sheet in which cup-like depressions have been formed, this sheet being supported at its edges by the case or crate in which it is placed. In this case it is also necessary to provide in the depressions and in the spaces between successive sheets space for the largest egg which it is necessary to pack.

Attempts have been made to provide a staggered egg pack in which the eggs do not register in vertical rows. Such an arrangement is wasteful of space in the crate or case and usually provides packing for different quantities of eggs in different layers which is also objectionable.

Some of the carriers heretofore designed provide for supporting successive carriers by means of projections either directly on the bottom of the egg pockets or cavities or else closely adjacent thereto. Such a construction requires a stiff rigid pocket cavity wall in order to accommodate the necessary load and also very largely prevents sufficient resiliency or flexibility of pocket to firmly hold eggs of varying size.

Some of the prior designs show arrangements of cushions, rings, flaps or other members intended to cushion smaller eggs in a large size pocket. These devices tend to concentrate pressure on the small end of the egg, thus contributing to breakage, and fail in the desired object to firmly grip each individual egg or other article over a considerable portion of its area.

It is the purpose of the present invention to very largely eliminate these objections and to provide a carrier for eggs or other similar fragile articles of varying sizes which will firmly retain each individual article in the pocket or cavity provided and also permit of assembling a series of such carriers one above the other.

My invention contemplates an integral carrier or pair of carriers so constructed as to be resiliently adaptable to fit eggs of different sizes. There is also provided integral with the carrier, supports which carry the weight of articles packed therein and also capable of carrying other packed carriers above this carrier.

The pocket or cavity in which the egg or other article is placed is small enough to properly grip each article and hold it firmly against looseness. The size of the pocket or cavity for this purpose is determined and fixed by spacing members between the bottom and top sections of the carrier which define the smallest size of pocket necessary to accomplish the desired result.

When larger articles are placed in these pockets or cavities the design is such that the pocket can expand either laterally for an egg or similar article of larger diameter than the original pocket size allowed and also can expand in the direction of depth or height to provide for a longer egg or other article.

Inasmuch as each individual pocket is provided with resilient or expansible means independent of any other pocket small, medium or large size articles can be packed in adjacent pockets.

By a novel design of the pocket wall in combination with the spacing members and supporting members flexibility or resiliency is provided for each individual pocket cavity so that they can individually accommodate themselves to larger eggs without interfering with adjacent pockets or the articles in these pockets. The supports for successive tiers or layers are spaced as widely as possible from the individual pockets, and exterior supports on each carrier section in combination with the spacing members inside each section provide adequate supports for the vertical loads encountered when several tiers or layers are placed one above the other. This is all accomplished by the minimum number of parts or assembly of parts as each half carrier is provided within itself as an integral part with the proper supports for itself or for other carriers to be placed upon it. It is also provided with integral spacing members to define the pocket spaces in each carrier and sustain the load of superimposed layers by the carrier structure independent of the articles in the carrier.

Illustration hereinafter described shows a carrier composed of two similar halves inverted upon each other. While this is desirable from an egg packing standpoint in that only one type of carrier is necessary for both bottom and top halves, still this construction is not to be considered limiting in any way as in the packing of other articles such as radio tubes, etc. the bottom halves of the carrier might be of sufficient depth to contain the greater portion of the packed article, the upper simply serving as a cover. It is understood that this invention is not limited as to the similarity of the upper and lower halves of the carrier. In such drawings:

Fig. 1 is a fragmentary section through a pocket on line 1—1, Fig. 5 with eggs of smaller size.

Fig. 2 a similar section through a pocket expanded as indicated by the dotted line to accommodate an egg of larger diameter, but medium length.

Fig. 3 a similar view showing the pocket expanded to accommodate an egg of both large diameter and extra length.

Figure 1:
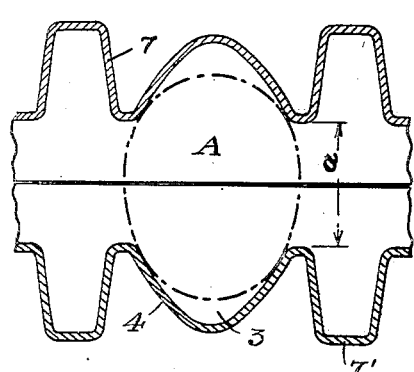
Figure 2:
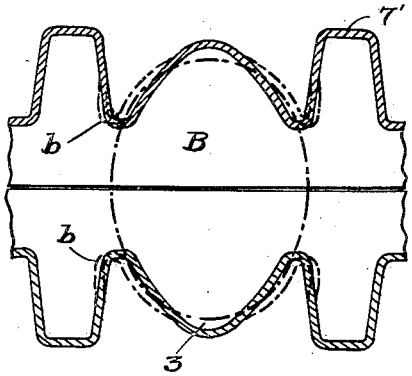
Figure 3:
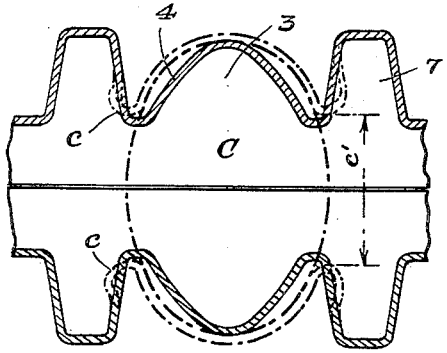
Figure 4:
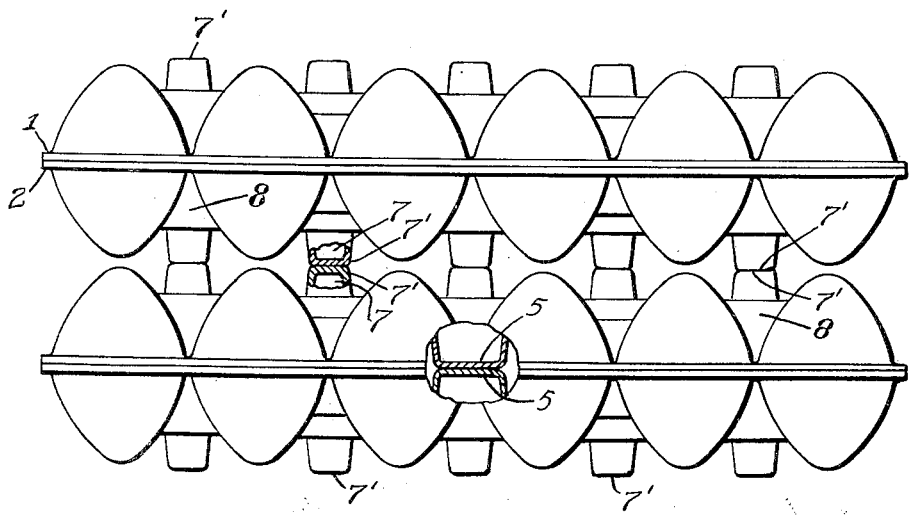
Fig. 4 is an elevation partly in section indicating two layer units and particularly illustrating the method of supporting such units in superimposed assembly without contact of the end walls of the pocket cavities on each other.

Referring first to Figs. 1, 2 and 3, I have illustrated the automatic expanding action of my carrier pockets for the three service conditions most frequently encountered, viz, an article of smaller size, Fig. 1; an article which is larger as to diameter, Fig. 2; or as to both diameter and length, Fig. 3.

The normal pocket size, Fig. 1, is purposely made to correspond to an article A of smaller size. Such article is cradled without looseness in the pocket without any appreciable expansion of the pocket either longitudinally or laterally. For purposes of explanation the comparison line $a$ has been applied to Fig. 1 to indicate the effective normal or unexpanded longitudinal dimension of the pocket wall.

When an article B which is larger as to diameter as compared with article A is inserted in a pocket Fig. 2, the pocket expands laterally, as indicated in dotted lines to accommodate such article. This involves a slight contraction of the inner end of the supporting member 7 adjacent the pocket, as indicated at $b$ in Fig. 2, resulting in a corresponding increase in the size of the pocket to accommodate itself to the contour of the article B.

When an article C which is larger both as to diameter and length, as compared with articles A and B, is inserted into a pocket Fig. 3, the expanding action is both laterally and longitudinally, the lateral expansion being indicated at $c$, and the longitudinal expansion at $c^1$.

This illustrates the dual function of the member 7 first as a supporting member which will be more completely explained hereinafter, and second, as a yielding member at its inner end to afford both lateral and longitudinal pocket expansion. In case of lateral pocket expansion the inner end of the member 7 yields laterally to provide for expansion of the pocket as indicated in Fig. 2. To provide for increased depth the fold is moved outwardly as indicated at $c$ and $c^1$ providing for longitudinal pocket expansion. It will be noted that the distance $c^1$ Fig. 3 is greater than the distance $a$ Fig. 1, this being due to the larger egg inserted in the pocket at Fig. 3.

Figure 5:
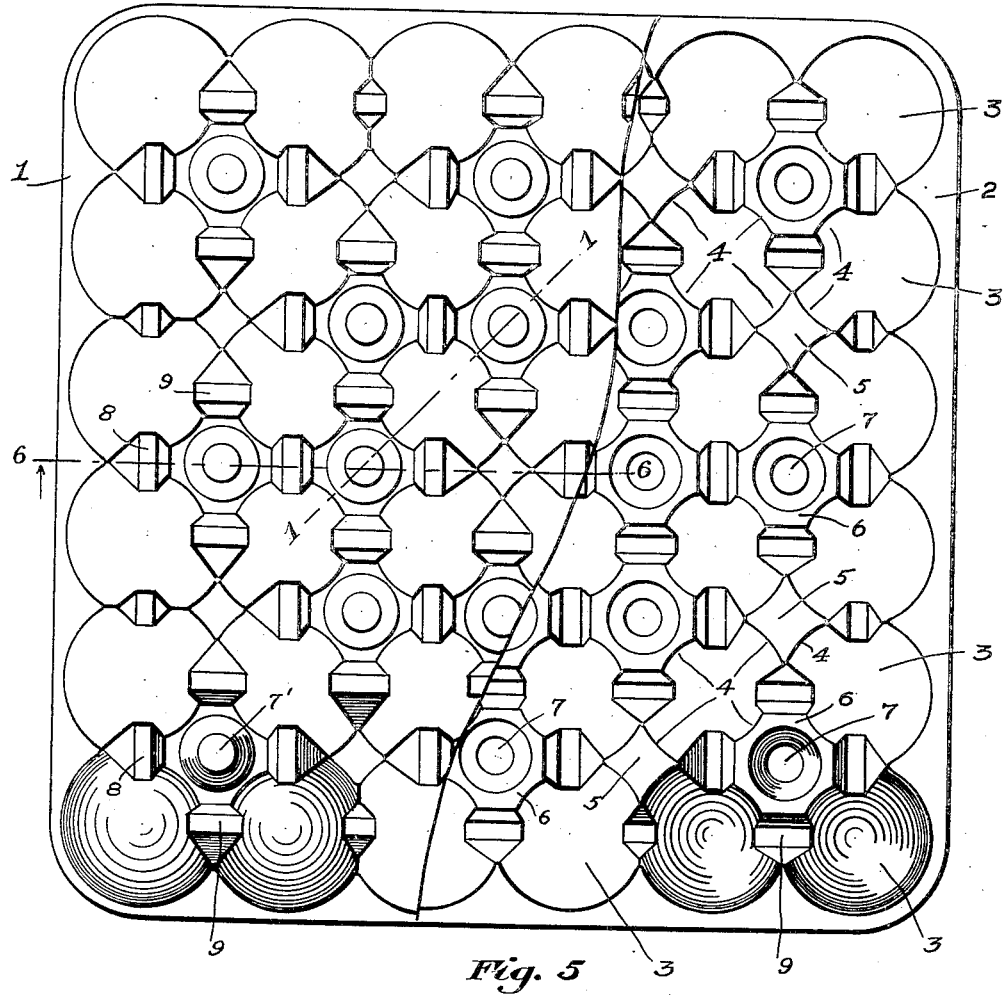
Fig. 5 is a plan view of a packing unit consisting of a pair of complemental pocket forming members reversed and assembled one upon another, the uppermost member being broken away to expose a part of the lower member.

The characteristic pocket above described is embodied in a carrier consisting of a pair of sheet-like packing members adapted to be reversed and assembled upon one another as shown in Fig. 5, and when so assembled providing a carrier unit within which the eggs or other articles are adapted to be packed. This packing is illustrative of eggs which are packed vertically.

The upper member of such unit is indicated at 1 and the lower member at 2 and these members together constitute a packing unit adapted to contain a layer or tier of eggs or other articles and themselves adapted to be superposed upon other similar layers within any usual packing case or crate.

The members 1 and 2 are preferably duplicates as previously suggested. Preferably each member is formed of molded pulp or other fibre stock and is of substantially uniform thickness throughout. Each member is molded or formed to a contour providing for the packing cavities or pockets, supporting members, spacing members, etc. as hereinafter described, all being produced as an integral unit.

The packing pockets are indicated at 3 in the drawings, and considering the packing unit as it appears in Fig. 6, the cavities 3 of the upper member 1 project above the plane of the member 1 and those of the member 2 are disposed below the general plane of such member. Together the registering cavities 3 define a series of enclosing compartments or pockets within which the eggs or other articles indicated A—C are received in endwise disposition, these pockets corresponding in general size, depth and contour to the size, depth and contour of the smaller size egg to be packed.

The protuberances 5 and 6 are in the nature of flat top formations with tapered concaved sides and have capacity for yielding as will be explained hereinafter. Certain of the protuberances are extended beyond the planes of the other protuberances in any sheet and have closed ends which constitute spacing members. These are indicated at 5 and in this particular design there are nine such protuberances distributed over the inside of the carrier.

The protuberances 5 are shown in form as tapered projection the flexible sides of which in part define pocket spaces and the flat tops of which afford bearing surfaces which make of the projections coacting spacing members between two halves of carrier units.

Figure 6:
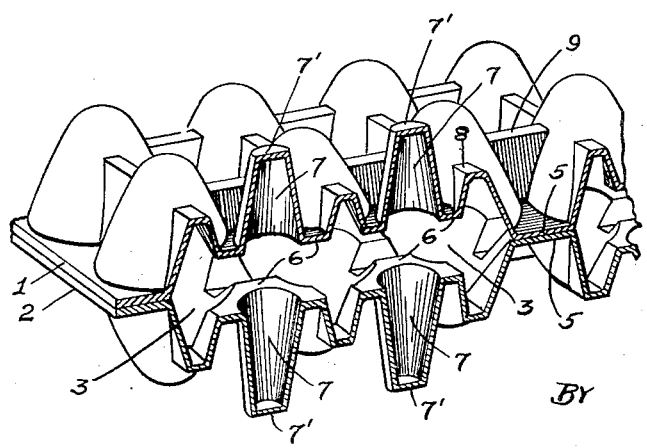
Fig. 6 is a fragmentary sectional perspective on approximately the line 2—2, of Fig. 1.

When a pair of members 1 and 2 are reversed upon each other as shown in Fig. 6, the flat closed outer ends of the protuberances 5 abut each other and function as load sustaining columns. These columns serve to define the minimum space between carrier halves and to prevent undue loads being placed on the eggs in each carrier unit due to loads placed on carrier unit.

The other protuberances which have been indicated by the numeral 6 are shorter than the protuberances 5 which members 5 are so arranged as to permit ample opportunity for access to the pockets 3 either for the purpose of inserting or removing eggs and hence to insert or remove several eggs at a time without interference from the higher protuberances 5.

The sorter protuberances 6 are so constructed as to provide crater-like depressions 7 centrally of the protuberance formations. These crater-like depressions or certain of them extend below the general plane of the pocket bottoms, considering the lower member 2 in the assembly of Fig. 6. Preferably, although not necessarily, the hollow projections 7 are of tapered form terminating in flat closed outer ends. These constitute supporting surfaces for each carrier and also for supporting other carries above as indicated in Fig. 3.

Due to the hollow formations of the protuberances 5 and 6 and particularly in the case of the crater-like formations of the elements 6 the egg pockets have capacity for expansion radially or laterally in order to take care of eggs of unusually large diameter. In such action the introduction of a larger size egg or the like endwise into the pocket cavity causes the flexible walls thereof, afforded by the elements 5 and 6 and particularly by the element 6 to yield to receive the large size egg and by their own inherent resiliency frictionally grip and support the egg, as has already been explained in connection with the discussion of Figs. 1, 2 and 3.

In order to strengthen and stiffen the sheet-like members 1 and 2 in both transverse directions, two series of interrupted grooves are provided in the structure which on the outer faces of said members extend as ribs 8 and 9, respectively. These ribs may be of any desired cross section and depth, but as here shown do not extend beyond the plane of the closed ends of the cavities 3, into which they merge and hence do not contact with the registering rib series of members in layer units above or below.

The integral shape of the pocket cavity is generally conical, any variation in diameters of the eggs being packed being taken care of by the flexible wall formations of the pockets as explained hereinbefore, so that the eggs are cradled between the protuberances or spacers without the necessity for providing the pockets interiorly with any definite cushioning or supporting elements, as for example, an internal ring or flap series.

The present invention thus takes care of variations both as to diameter and as to length of the articles being packed. The design of the side walls of the egg cavities enables such cavities headily to expand laterally when eggs of unusually large diameter are introduced endwise thereinto. It will be noted as an important feature of the invention that as larger and heavier eggs are introduced in pockets there is an increasing area of supporting surface of the resilient cavity wall which in case of the larger eggs grips firmly the entire end surface or portion of the egg extending approximately half the distance toward the middle of the egg as at B and C in Figs. 2 and 3.

While I have referred particularly to the endwise packing of eggs in crates it will be understood that the principles herein set forth might be embodied in smaller types of carriers such as grocers' packs or cartons which usually hold one dozen eggs and in certain types could be made to carry the eggs packed on their sides.

The shape of the spacers or protuberances may be varied and the construction of their interior relief varied as to the shape of the crater or thimble and its depth.

What I therefore claim and desire to secure by Letters Patent is:—

1. An egg carrier member adapted for opposed assembly comprising a relatively thin wall molded fibre section adapted to support the ends of a plurality of eggs in vertical position, said section including spaced pockets and inter-pocket spacing convexities including those having end abutting portions, the concavities and convexities having a non-crushing resistant deformability yieldable to the pressure of larger dimensioned eggs whereby said walls are individually resistantly deformable to accommodate individual eggs in superimposed layers.

2. In a device of the class described, complemental members having pocket forming cavities adapted to register with each other when the members are reversed and assembled one upon the other, and to define article receiving pockets, formations extending from the plane of each member, certain of formations extending beyond the plane of the other formations of a member and said longer formations adapted to abut the similar longer extensions of an opposite member and to constitute shock-absorbing columns disposed generally transverse to the planes of the pair of members, and the shorter formations of one member having portions which extend in opposite directions to the shock-absorbing formations of said member and adapted to abut similar portions shorter formations of an opposite member whereby to space the ends of opposing pocket cavities from each other, the sets of long formations of one member being relatively staggered to the portions of the shorter formations of said member which extend in opposite direction whereby to permit pocket flexibility in an endwise direction for accommodating articles of varying length.

3. An egg carrier member having receiving concavities adapted to be assembled in reversed pairs, the concavities being spaced by intervening projections some having abutments for spacing pocket pairs and others having reversed abutments for inter-layer support, the inter-layer supports being distributed among the pockets so as to leave the pockets depressibly supported therebetween.

4. An article carrier comprising a pair of contoured layers of pulp adapted to be reversed and assembled on planes of face contact, and each having a plurality of spaced depressed portions constituting receiving pockets and each member having elevated formations intermediate of the pockets constituting when said pair of members are reversed and assembled upon each other intra-laminal sustaining elements adapted to interiorly space said members from each other and each member having a plurality of formations extending in opposite direction to said elevated formations and constituting when a plurality of pairs of carrier members are assembled upon each other extra-laminal sustaining elements adapted exteriorly to space one pair of carrier members from the pairs next above and below.

5. An article carrier comprising a pair of contoured layers of pulp adapted to be reversed and assembled on planes of face contact, and each having a plurality of spaced depressed portions constituting receiving pockets and each member having elevated formations intermediate of the pockets constituting when said pair of members are reversed and assembled upon each other intra-laminal sustaining elements adapted to interiorly space said members from each other and each member having a plurality of formations extending in opposite direction to said elevated formations and constituting when a plurality of pairs of carrier members are assembled upon each other extra-laminal sustaining elements adapted exteriorly to space one pair of carrier members from the pairs next above and below, the intra-laminal formations being staggered with reference to the extra-laminal formations.

6. An article carrier as claimed in claim 4, wherein said intra-laminal sustaining elements constitute part of the walls of said receiving pockets and are resistantly yieldable to the pocket expanding pressure of larger dimensioned articles inserted in said pockets.

7. An article carrier as claimed in claim 4, wherein said extra-laminal sustaining elements constitute part of the walls of said receiving pockets and are resistantly yieldable to the pocket expanding pressure of larger dimensioned articles inserted in said pockets.

8. An article carrier as claimed in claim 4, wherein both said intra-laminal and said extra-laminal sustaining elements constitute parts of the wall of said receiving pockets and are resistantly yieldable to the pocket expanding pressure of larger dimensioned articles inserted in said pockets.

9. An article carrier, comprising a sheet of fibrous material having a plurality of spaced pocket-forming depressions therein, a set of spacers extending upwardly from the sheet and spacing certain of said pocket-forming depressions from each other, and a set of spacers extending downwardly from the sheet and spacing certain other of said depressions from each other, the spacers constituting said sets of spacers being relatively staggered as to each other whereby when said carrier is disposed in layer assembly with duplicate carriers the upwardly extending spacers serve as intra-laminal load sustaining elements and the downwardly-extending spacers serve as extra-laminal load sustaining elements and the pocket-forming depressions in any layer are prevented from coming in end-to-end abutment with those in any other layer.

10. An article carrier as claimed in claim 9, wherein the spacers of both sets form in part the walls of said depressions and have a non-crushing resistant deformability yieldable to the pressure of larger dimensioned articles inserted in said pocket depressions whereby said pockets are individually resistantly deformable to accommodate articles of varying size.

11. An article carrier as claimed in claim 9, wherein the pocket forming depressions are connected by hollow ribs of a depth less than the depth of said depressions.

12. An article carrier as claimed in claim 9, wherein the downwardly extending spacers are hollow and terminate in relatively flat closed bearing portions disposed no closer to the plane of the sheet than the closed ends of the cavity pocket depressions.

13. An article carrier as claimed in claim 9, wherein the upwardly extending spacers are hollow and terminate in substantially flat closed bearing portions.

14. An article carrier comprising a sheet of fibrous material having a plurality of spaced pocket forming depressions therein certain of said depressions being spaced from each other by spacers which extend in the same direction as said depressions and constitute exteriorly of the sheet load sustaining elements for external bearing on the aligned similar spacers of a complemental article carrier and the depressions of said sheet not so spaced by said first named spacers being spaced by other spacers which extend in the opposite direction to said depressions and constitute internally of the sheet load sustaining elements independent of and staggered with reference to said first named spacers for intra-laminally supporting a complemental article carrier.

MERLE P. CHAPLIN.